(12) United States Patent
Wang

(10) Patent No.: US 6,907,275 B2
(45) Date of Patent: Jun. 14, 2005

(54) METHOD FOR INPUTTING, DISPLAYING AND TRANSMITTING HANDWRITING CHARACTERS IN A MOBILE PHONE AND MOBILE PHONE ENABLE TO USE THE SAME

(75) Inventor: Qing Wang, Shanghai (CN)

(73) Assignee: ZTE Corporation, Shenzhen (CN)

( * ) Notice: Subject to any disclaimer, the term of this patent is extended or adjusted under 35 U.S.C. 154(b) by 443 days.

(21) Appl. No.: 09/842,943

(22) Filed: Apr. 26, 2001

(65) Prior Publication Data

US 2002/0010006 A1 Jan. 24, 2002

(30) Foreign Application Priority Data

Jul. 21, 2000 (CN) ........................................ 0119503 A

(51) Int. Cl.[7] ................................................ H04B 1/38
(52) U.S. Cl. ................ 455/566; 455/550.1; 379/88.12; 345/179
(58) Field of Search ............................. 455/566, 550.1, 455/410, 411, 418; 379/187, 311, 88.12, 67.1; 345/179, 169, 156, 173; 382/187, 311, 314

(56) References Cited

U.S. PATENT DOCUMENTS

| | | | | |
|---|---|---|---|---|
| 5,561,446 A | * | 10/1996 | Montlick | 345/173 |
| 5,724,457 A | * | 3/1998 | Fukushima | 382/311 |
| 5,742,705 A | * | 4/1998 | Parthasarathy | 382/185 |
| 5,895,906 A | * | 4/1999 | Danielson et al. | 235/462.45 |
| 6,333,973 B1 | * | 12/2001 | Smith et al. | 379/88.12 |
| 6,351,634 B1 | * | 2/2002 | Shin | 455/410 |
| 6,374,123 B1 | * | 4/2002 | Kim | 455/556.1 |
| 6,453,179 B1 | * | 9/2002 | Larsen | 455/566 |
| 6,477,274 B1 | * | 11/2002 | Kim et al. | 382/187 |

FOREIGN PATENT DOCUMENTS

| | | |
|---|---|---|
| CN | 1159269 A | 9/1997 |
| CN | 1238895 A | 12/1999 |

* cited by examiner

Primary Examiner—Nick Corsaro
Assistant Examiner—Tan Trinh
(74) Attorney, Agent, or Firm—Fish & Richardson P.C.

(57) ABSTRACT

The invention provides a method for inputting, displaying and transmitting handwriting characters used in a mobile phone and said mobile phone. The method according to the invention comprises the steps of: inputting handwriting characters; sampling said handwriting characters; performing A/D conversion of the sampled handwriting characters to obtain a signal; encoding said signal in accordance with a specific protocol to obtain encoded data; converting the encoded data into mobile phone acceptable data, and outputting them; and processing the mobile phone acceptable data to display the handwriting characters and to transmit them as a short message, or to receive and display a short message (from other mobile phone) comprising the handwriting characters.

20 Claims, 3 Drawing Sheets

|       | MSB |     |     |     |     |     |     |     |
|-------|-----|-----|-----|-----|-----|-----|-----|-----|
| Byte1 | 1   | op  | P0  | CDP | 1   | B2  | B1  | B0  |
| Byte2 | 0   | X6  | X5  | X4  | X3  | X2  | X1  | X0  |
| Byte3 | 0   | X13 | X12 | X11 | X10 | X9  | X8  | X7  |
| Byte4 | 0   | Y6  | Y5  | Y4  | Y3  | Y2  | Y1  | Y0  |
| Byte5 | 0   | Y13 | Y12 | Y11 | Y10 | Y9  | Y8  | Y7  |
| Byte6 | 0   | P7  | P6  | P5  | P4  | P3  | P2  | P1  |

Figure 3

Default Alphabet:

| 0xo1 | N |
|------|---|

UCS2

| 0X02 | N1 | N2 |
|------|----|----|

8Bit

| 0x03 | Length | Data (n-byte) |
|------|--------|---------------|

Reserved

| 0x04 | Length | Data (n-byte) |
|------|--------|---------------|

Handwriting Input

| 0x05 | Length | Data (n-byte) |
|------|--------|---------------|

Figure 4

METHOD FOR INPUTTING, DISPLAYING AND TRANSMITTING HANDWRITING CHARACTERS IN A MOBILE PHONE AND MOBILE PHONE ENABLE TO USE THE SAME

FIELD OF THE INVENTION

The present invention relates to a method for inputting handwriting characters in a mobile terminal, in particular, to a method for inputting, displaying and transmitting handwriting characters used in a mobile phone, and to a mobile phone for which the method can be used.

BACKGROUND OF THE INVENTION

At present, the phonetic input method and the stroke-order input method are generally adopted in a few mobile phones such as MOTOROLA CD928 which can be input Chinese characters. The input Chinese characters are displayed in several fixed formats such as Song style and FangSong style. In this case, some new functions of a mobile phone like receiving and transmitting a short message in Chinese cannot be used appropriately. Especially, the existing MMI (Man-Machine Interface) of mobile phones has the following defects: (1) The input characters are limited by the character-set that a mobile phone can receive. Generally, limited by its capacity, a mobile phone just supports a specified character-set. The other characters that do not belong to the character-set cannot be supported by the phone. Thus, those communications based on the characters like a short-message transmission among mobile phones supporting different character-sets will encounter some obstacles. (2) Input speed under a conventional Chinese character input method is slow. Regardless of the phonetic input method or the stroke-order input method, this problem is hard to be solved. The primary reason is that, since any one of the known input methods adopts 0–9 numeric keyboard, the input speed is limited by this keyboard and the repetition rate of codes is very high. Some known methods for decreasing the repetition rate of codes need the users to provide additional coding information, which not only imposes higher requirements to users but also does not comply with the conventional input custom. (3) A conventional interface is unitary. Most mobile phones adopt the same character style, which is not in conformity with the tendency of individuality of mobile phones. For example, when we process some information, we just identify the sending side of the information according to the sender's phone number, rather than according to the sender's character style as normal mails do. Thus, some new ideas regarding input methods and display manners are needed to enhance the individuality of the mobile phone. (4) Since mobile phones have become more and more popular, some users are not able to use existing input methods. So, some related functions are virtually never used. In one word, the existing character input and display method cannot meet the requirements of making mobile phones popular and adapting the mobile phones to various users.

SUMMARY OF THE INVENTION

In view of the above shortcomings in the prior art, an object of the present invention is to provide a method for inputting, displaying and transmitting handwriting characters for a mobile phone.

In view of the above shortcomings in the prior art, another object of the invention is to provide a mobile phone having function of inputting, displaying and transmitting the handwriting characters. The mobile phone is capable of keeping the input character style intact when transmitting a short-message in Chinese and simplifying input operation without any input rules.

To achieve the above objects of the present invention, a method for inputting, displaying and transmitting handwriting characters used in a mobile phone is provided, which comprises the following steps of:

a) inputting handwriting characters;

b) sampling said handwriting characters;

c) performing A/D conversion of the sampled handwriting characters to obtain a signal;

d) encoding said signal in accordance with a specific protocol to obtain encoded data;

e) converting the encoded data into mobile phone acceptable data, and outputting them; and f) processing the mobile phone acceptable data to display the handwriting characters, to transmit them as a short message, or to receive and display a short message (from other mobile phone) comprising the handwriting characters.

Said step e) comprises a step of performing level with respect to an external interface of a handwriting character input module.

Said step e) further comprises providing an additional power supply to said handwriting character input module.

Said step f) comprises the following steps of:

communicating with an interface module, comprising interpreting the received data according to the specific protocol and outputting dot-information corresponding to said handwriting characters;

displaying the handwriting characters; and encoding the short message including the handwriting characters so as to enable the short message to be transmitted by a mobile phone.

Step f) further comprises a step of decoding the short-message including the handwriting characters after receiving it so that the handwriting characters included in the short message can be identified.

In the invention, the above step of communicating with the interface module further comprises the following steps of:

setting a receiving port appropriately so as to receive a data stream including the handwriting characters;

interpreting the received data stream and outputting dot-information orresponding to the handwriting characters; and compressing the outputted dot-information.

Said step of interpreting the received data comprises the following steps of:

determining whether or not individual character has been completely input; and interpreting the received data in the unit of individual character.

The step of determining whether or not individual character has been completely input is performed by judging whether point coordinates of the individual character fall into a specific scope or according to the length of pause time during inputting the individual character.

Said step of displaying the handwriting characters further includes the following step of determining the type of the input characters and displaying them.

Said step of decoding the short message including handwriting characters includes the following steps of:

determining whether or not the received short message includes handwriting characters;

decoding the handwriting characters if the short message includes the handwriting characters; and processing standard characters included in the received short message in a conventional manner, if any.

Said step of interpreting the received data stream includes the following steps of:

determining a position of the tracing point of the handwriting characters according to X- and Y-coordinates of the tracing point thereof; and determining whether or not the inputting of the handwriting characters is completed according to a pressure value p of the handwriting input module.

The above step of encoding the short message including handwriting characters comprises the following steps of:

setting one byte to represent the type of data that follows at the beginning of a character string;

setting one byte to represent those characters belonging to Default Alphabet character-set, each of which has 7 bits;

setting two bytes to represent those characters belonging to UCS2, each of which has 16 bit codes; and setting two bytes to represent data length of other characters, followed by the data.

The present invention also provides a mobile phone with a function of inputting, displaying and transmitting handwriting characters, comprising:

a handwriting input module for inputting the handwriting characters, performing A/D conversion and encoding the converted signal, and outputting encoded data complying with a specific protocol;

an interface module for performing a signal conversion of the encoded data and outputting data acceptable to a mobile phone; and a handwriting characters process module for processing the received data to display handwriting characters, or transmitting and receiving a short message including the handwriting characters.

Said interface module is a transformer for performing a level conversion of the input encoded data, and may include an additional power supply to the handwriting input module.

According to the invention, said handwriting characters process module includes:

a communication module for interpreting data output from the interface module and outputting dot information corresponding to handwriting characters;

a display module for displaying the handwriting characters;

an encoder for encoding the dot information of the handwriting characters and outputting a transmissible short message including the handwriting characters; and a decoder for decoding the received short message including the handwriting characters, and outputting recognizable and displayable handwriting characters.

Said communication module includes:

an adapter for matching with the interface module and outputting required data stream;

a data processor for interpreting the data received from the adapter and outputting dot information corresponding to the handwriting characters in the unit of the characters; and a compressor for performing a compression conversion of the dot information and outputting the compressed dot information corresponding to the handwriting characters.

Said data processor includes a first recognizer for determining whether or not the inputting of the handwriting characters is completed, which may be either a recognizer for judging whether or not the inputting of a character is completed according to whether or not a point coordinate of the character falls into a specific scope, or a recognizer for judging whether or not the inputting of a character is completed according to the length of pause time during inputting the character.

The above display module includes:

a second recognizer for determining the input characters being handwriting characters or mixed characters which include handwriting characters and standard characters, and outputting a corresponding signal;

a first display for displaying the handwriting characters in a deformative form or in a standard form; and a second display for displaying the handwriting characters in a standard form and outputting standard mixed characters.

According to the invention, the characters used in a mobile phone are adapted in various character styles without the current limitation. The individuality and practicability of a mobile phone are enhanced. The MMI becomes more attractive and the user can input the characters with a "pen" according to his own custom. Thereby, the input speed is improved. In addition, other advantages of the invention are:

(1) There is no limitation to the Chinese character codes and the compatibility of various character-sets is available;

(2) A short message including handwriting characters can be transmitted between the mobile phones which support the handwriting characters and the mobile phones become more effective personal communication tool; and (3) A short message not only including handwriting characters but also including pictures and the like can be transmitted with a modification to the above scheme.

BRIEF DESCRIPTION OF THE DRAWINGS

FIG. 3 is a frame format diagram of adopting MG Logic JX-0605 handwriting panel; and FIG. 4 is a coding format of a short message including handwriting characters.

The foregoing features and other features, advantages and objects of the present invention will become more apparent and be more readily understood from the following detailed description in conjunction with the accompanying drawings.

DESCRIPTION OF THE PREFERRED
EMBODIMENTS OF THE INVENTION

Embodiment 1

This embodiment of the present invention is described as follows. To complete inputting, displaying and transmitting handwriting characters in a mobile phone according to the present invention, there are three stages: inputting the handwriting characters, converting the interface data and processing the input handwriting characterss. After the mobile phone input module senses the input handwriting characters, it performs sampling, A/D conversion and encoding process in respect of the sensed information, and then transmits the encoded signal of the handwriting characters in conformity with a specific protocol to an interface module. According to different interfaces of various mobile phones, the interface module converts the received handwriting characters codes into various data corresponding to various phones. A communication module receives the handwriting characters information transmitted from the interface module. The communication module converts the received information into a displayable information for displaying it on screen, and compresses and stores the received information. The transmission of handwriting characters among various mobile phones may be in form of a short message, infrared transmission, or the like. The sender encodes the information to be transmitted. The receiver decodes the received information for displaying, compiling and storing the same.

The conversion of the interface data is carried out as follows. Since the handwriting characters input module and the phones have different interfaces from each other, the conversion of the interface data is designed in view of various types of the mobile phone so as to ensure that the handwriting input means normally communicates with various phones. For example, if a standard RS-232C interface is used as the output port of a handwriting character input module, the conversion of the interface data is to convert the levels between RS-232C interface and the various phones'communication interfaces so as to match the handwriting input module with the phones'communication interfaces. In addition, since the existing handwriting input module is usually a passive element, an additional power supply is needed to power the RS-232C interface during converting the interface data.

Figure 2:
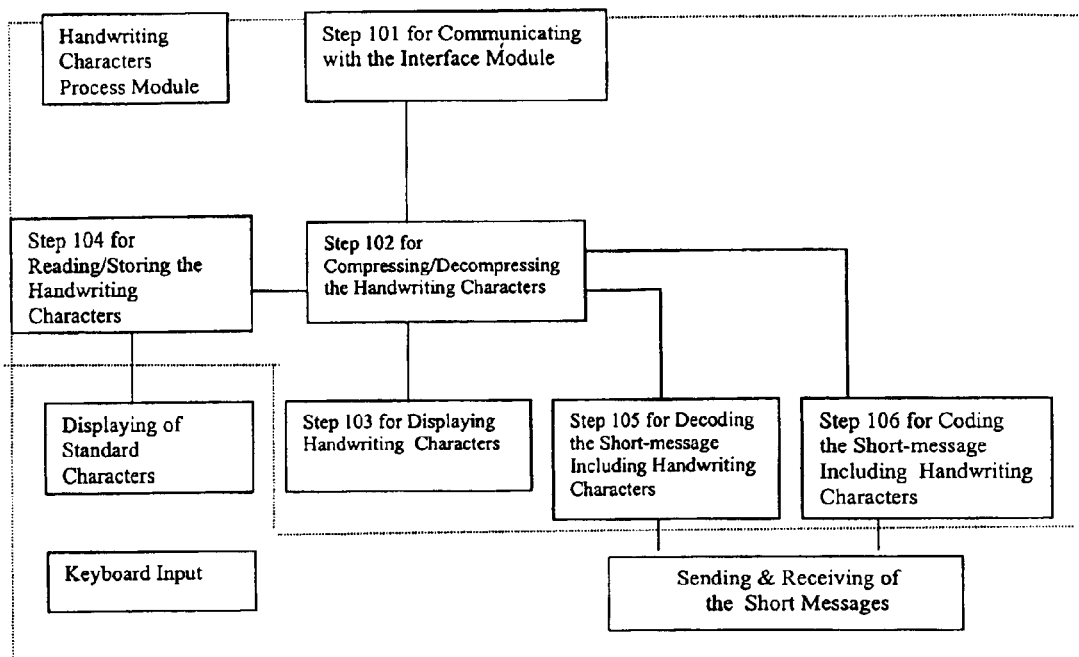
FIG. 2 is a block diagram of processing handwriting characters according to the method of present invention.

As shown in FIG. 2, a method for inputting, displaying and transmitting handwriting characters used in a mobile phone according to the invention comprises the following steps: step 101 for communicating with the interface module; step 102 for compressing decompressing the input handwriting characters; step 103 for displaying the handwriting characters; step 104 for storing/reading the handwriting characters; step 105 for decoding a short message including the handwriting characters, and step 106 for coding the shortmessage including the handwriting characters.

The handwriting characters data transmitted from the interface module communicate with the communication module of a mobile phone in step 101. The communication module interprets the received data according to a specific protocol and outputs dot-information corresponding to the handwriting characters. In step 102, the handwriting characters dot-information transmitted from the communication module is compressed/decompressed by a compression/decompression module, and the dot-information is stored in step 104. The compressed handwriting characters dot-information is transmitted to a handwriting characters display for displaying the handwriting characters in step 103. When a shortmessage is transmitted, the compressed handwriting characters dot-information is encoded in step 106 so that the short-message including the compressed handwriting characters codes can be transmitted with a conventional short message transmission method. When a short-message is received, the short-message including handwriting characters is decoded in step 105 and is transferred to a display for displaying in step 103.

The communication (101) with the interface module can be implemented in a way of:

a) Setting a serial port for receiving the data so as to communicate with the handwriting input module and receive a required data stream;

b) Interpreting the data received from the serial port and outputting dot-information of handwriting characters, wherein the interpretation of the received data is performed according to the types of the handwriting input module and the different transmission protocols.

As shown in FIG. 3, when the input module is a MG Logic JX-0605 handwriting panel, the input data includes mainly the following information: X0–X13 for representing the X-coordinates of the input points; Y0–Y13 for representing the Y-coordinates of the input points, the location of an input point being determined according to its X-coordinate and Y-coordinate; and P0–P7 for representing the pressure values, ranging from 0–255. When the pressure value of a point is less than a specified value, the point is deemed invalid in consideration that the handwriting tool (for instance, a pen) does not sufficiently contact the handwriting panel.

The above arrangement takes a character as an input unit. In this case, the interpretation of the received data further comprises recognizing whether a character is completely input. The recognition is performed by judging whether or not each point falls into a specific scope, and may also performed according to the pause time of each character during it is input.

c) Compressing the dot-information. The handwriting characters dot-information is compressed so as to enhance the usage of the data. The patented dot-information compression method owned by BIJI Company may be adopted in the invention.

In step 103 for displaying the handwriting characters, the type of the input characters is determined at first. If the input characters are purely in handwriting, the input characters can be displayed in deformative form by means of a patented rector/dot matrix compression technique owned by BIJI Company. If the input characters include handwriting characters and standard characters, the mixed handwriting characters and standard characters are displayed together.

In this embodiment, the transmission of the handwriting characters comprises the following steps of:

1) establishing a new short-message based on the existing short-message menu of a mobile phone;

2) inputting handwriting characters by means of a handwriting panel or inputting standard characters by means of a standard keyboard, wherein the compressed information of the handwriting characters and the codes of the standard-character are stored; and 3) encoding the stored information (105), wherein the compressed information including the handwriting characters and the codes of the standard characters are transmitted by means of the existing short-message transmission function.

It is observed that the compiling method of the short-message including handwriting characters is similar to that of a conventional short-message. Its actual implementation depends on the type of a mobile phone. When transmitting the shortmessage including handwriting characters, it is necessary to re-encode the short-message so that the handwriting characters included in the short-message can be transmitted.

As shown in FIG. 4, the method for encoding the short-message data should be designed in view of the types of data so as to ensure the receiver can interpret the short-message including handwriting characters and obtain the information of the handwriting characters for displaying.

In order to properly transmit the data, TP-DCS (defined in GSM 03.40 and GSM 03.38) may be set as 8 bits. Considering that some short-message centers do not strictly follow the GSM protocol, a conversion of data is needed. For example, transmission of data can be performed in form of Default Alphabet codes format. Furthermore, in order to distinguish the short-message including handwriting characters from the conventional short-message, according to a specific protocol GSM 03.40 with respect of a shortmessage in GSM, TP-UDHI in the header of the short-message is set as 1 and a new header is defined in TP-UD for recognizing whether the short-message includes handwriting characters or not, as well as whether to cascade.

A specific encoding manner is as follows:

1) at the beginning of a character string, using one byte to represent the type of a data that follows;
2) using one byte to represent those characters belonging to Default Alphabet character-set, each of which has 7 bits;
3) using two bytes to represent those characters belonging to UC2, each of which has 16 bit codes; and
4) for the rest three types of characters, using two bytes to represent their data lengths because the data lengths are indefinite, followed by data.

This encoding manner can be significantly extended. Since the new header of date has used one byte as identity of the type of data, total 256 types of data can be distinguished from each other, which can meet most users' requirements.

Receiving the short-message including handwriting characters comprises the following steps of:

1) receiving the short-message by using the existing short-message menu of a mobile phone;
2) judging whether or not the received short-message includes the handwriting characters according to TP-UDHI and the newly added header of the shortmessage, and if yes, the received short-message being decoded in the following manners:
   a) the standard character included in the received short-message is processed according to conventional manner; and
   b) the compressed information of the handwriting characters included in the received short-message is extracted from the short-message and then is processed to obtain the dot matrix information which the mobile phone can display, and
3) displaying the standard character and the handwriting characters.

Embodiment 2

Figure 1:
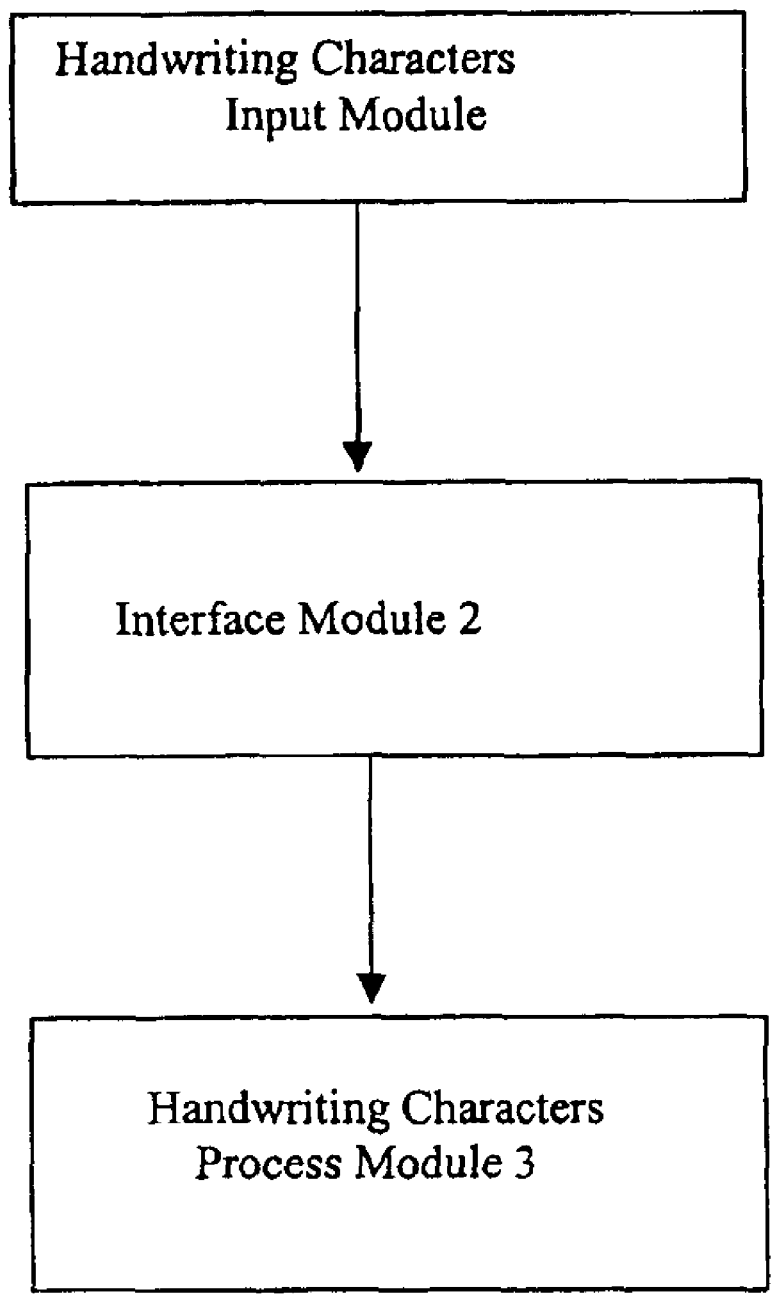
FIG. 1 is a block diagram of a mobile phone having function of inputting handwriting characters according to the present invention.

As shown in FIG. 1, a mobile phone having function of inputting, displaying and transmitting handwriting characters according to the present invention comprises:

a handwriting input module 1 which may be a conventional handwriting input means with an RS-232C serial port as output port;

an interface module 2; and (Although conventional handwriting input means uses standard RS-232C serial port as an output port, the external interface of a conventional mobile phone does not match with the standard RS-232C port. In fact, each type of mobile phone adopts its own specific interface. So, it is necessary to provide a module for completing the interface conversion between the handwriting input means and a mobile phone.)

a handwriting characters process module 3.

As to the handwriting-input module 1, after a mobile phone input module 1 senses the input handwriting characters, it performs A/D conversion and encoding process in respect of the sensed information and then transmits the handwriting characters codes being in conformity with a specific protocol to an interface module. According to the different interfaces of various mobile phones, the interface module converts the received handwriting characters codes into various data acceptable and understandable to various phones. A communication module receives the handwriting characters information transmitted from the interface module. The communication module converts the received information into the displayable dot matrix information for displaying it on a LCD screen in a certain format, as well as the module compresses and stores the received information. The transmission of handwriting characters among various mobile phones may be in form of a short-message transmission, an infrared transmission, or the like. The sender encodes the dot information to be transmitted to the receiver. The receiver decodes the received information for displaying, compiling and storing the same.

As to the interface module 2, it is observed that the handwriting input module and the phone have different interfaces from each other. So, the conversion of interface data is performed in view of the phone's type so as to make sure the communication between the handwriting input means and the phone. For example, if the output port of a handwriting input module is a standard RS-232C port, the conversion of interface data is the conversion of levels between the standard RS-232C port and the phone's communication interface in order to match the input module with the phone's communication interface. In addition, since the conventional handwriting input module of mobile phone is a passive element, an additional power supply is needed for powering the RS-232C port during converting the interface data.

As to a phone's handwriting characters process module 3, which may comprise:

a communication module for interpreting the output data from the interface module and outputting handwriting characters dot-information;

a handwriting characters display module;

an encoder of the short-message including the handwriting characters for encoding the handwriting characters dot-information and outputting a transmissible short-message including the handwriting characters; and a decoder of the short-message including the handwriting characters for decoding the received short-message and outputting the recognizable and displayable handwriting characters.

In the above handwriting characters process module, the communication module comprises:

a serial port adapter for matching the interface module and outputting correct data stream;

a data processor for interpreting the received data from the serial port in the unit of character and outputting handwriting characters dot-information; and a compressor for performing compression conversion of the handwriting characters dot-information and outputting compressed handwriting characters dot-information.

BIJI Company's patented technique may preferably be used for performing the compression conversion of the dot-information.

The data processor comprises a recognizer for recognizing whether a character is completely input. The recognition is taken according to whether the coordinates of each point fall into a specific scope, or according to the length of pause time when inputting handwriting characters.

The handwriting characters display module comprises:
- a character type recognizer for judging the input character being handwriting or mixed characters (including handwriting character and standard character) and outputting a corresponding signal;
- a handwriting characters display for displaying the standard characters or deformed handwriting characters for which BIJI company's patented vector/dot matrix compression conversion may preferably be used; and
- a mixed character display for displaying the handwriting characters in standard form whose output is standard mixed characters.

What I claim is:

1. A method for inputting, displaying and transmitting handwriting characters in a mobile phone, comprising the following steps of:
   a) inputting handwriting characters;
   b) sampling said handwriting characters;
   c) performing A/D conversion of the sampled handwriting characters to obtain a signal;
   d) encoding said signal in accordance with a specific protocol to obtain encoded data,
   e) converting the encoded data into mobile phone acceptable data, and outputting them; and
   f) processing the mobile phone acceptable data to display the handwriting characters and to transmit them as a short message, or to receive and display a short message (from other mobile phone) comprising the handwriting characters, comprising:
      communicating with an interface module, comprising interpreting the received data according to the specific protocol and outputting dot-information corresponding to said handwritting characters;
      displaying the handwriting characters; and
      encoding the short message including the handwriting characters so as to enable the short message to be transmitted by the mobile phone.

2. The method according to claim 1, wherein said step e) comprises performing a level conversion with respect to an external interface of a handwriting character input module.

3. The method according to claim 2, wherein said step e) further comprises providing an additional power supply to said handwriting character input module.

4. The method according to claim 1, wherein said step f) comprises decoding the short-message including the handwriting characters after receiving it so that the handwriting characters included in the short message can be identified.

5. The method according to claim 4, wherein the step of decoding the short message including handwriting characters includes the following steps of:
   determining whether or not the received short message includes handwriting characters;
   decoding the handwriting characters if the short message includes the handwriting characters; and
   processing standard characters included in the received short message in a conventional manner, if any.

6. The method according to claim 1, wherein the step of communicating with the interface module further comprises the following steps of:
   setting a receiving port appropriately so as to receive a data stream including the handwriting characters;
   interpreting the received data stream and outputting dot-information corresponding to the handwriting characters; and
   compressing the outputted dot-information.

7. The method according to claim 6, wherein the step of interpreting the received data comprises the following steps of:
   determining whether or not individual character has been completely input; and interpreting the received data in the unit of individual character.

8. The method according to claim 7, wherein the step of determining whether or not individual character has been completely input is performed by judging whether point coordinates of the individual character fall into a specific scope.

9. The method according to claim 7, wherein the step of determining whether or not individual character has been completely input is performed according to a pause time during inputting the individual character.

10. The method according to claim 6, wherein the step of interpreting the received data stream includes the following steps of:
    determining a position of the tracing point of the handwriting characters according to X- and Y-coordinates of the tracing point thereof; and
    determining whether or not the inputting of the handwriting characters is completed according to a pressure value p of the handwriting input module.

11. The method according to claim 1, wherein the step of displaying the handwriting characters includes the following steps of:
    determining the type of the input characters; and
    displaying the characters.

12. The method according to claim 1, wherein the step of encoding the short message including handwriting characters comprises the following steps of:
    setting one byte to represent the type of data that follows at the beginning of a character string;
    setting one byte to represent those characters belonging to Default Alphabet character-set, each of which has 7 bits;
    setting two bytes to represent those characters belonging to UCS2, each of which has 16 bit codes; and
    setting two bytes to represent data length of other character, followed by the data.

13. A mobile phone with function of inputting, displaying and transmitting handwriting characters, comprising:
    a handwriting input module for inputting the handwriting characters, performing A/D conversion, encoding the converted signal, and outputting encoded data complying with a specific protocol;
    an interface module for performing a signal conversion of the encoded data and outputting data acceptable to a mobile phone; and
    a handwriting character process module for processing the received data to display handwriting characters, or transmitting and receiving a short message including the handwriting characters, the handwriting character process module including:
       a communication module for interpreting data output from the interface module and outputting dot information corresponding to handwriting characters;
       a display module for displaying the handwriting characters;
       an encoder for encoding the dot information of the handwriting characters and outputting a transmissible short message including the handwriting characters; and a decoder for decoding the received short message including the handwriting characters, and outputting recognizable and displayable handwriting characters.

14. The mobile phone according to claim 13, wherein said interface module is a transformer for performing a level conversion of the input encoded data.

15. The mobile phone according to claim 13, wherein said interface module includes an additional power supply to the handwriting input module.

16. The mobile phone according to claim 13, wherein said communication module includes:
   an adapter for matching with the interface module and outputting required data stream;
   a data processor for interpreting the data received from the adapter and outputting dot information corresponding to the handwriting characters in the unit of the characters; and
   a compressor for performing a compression conversion of the dot information and outputting the compressed dot information corresponding to the handwriting characters.

17. The mobile phone according to claim 16, wherein said data processor includes a first recognizer for determining whether or not the inputting of the handwriting characters is completed.

18. The mobile phone according to claim 17, wherein said first recognizer is a recognizer for judging whether or not the inputting of a character is completed according to whether or not a point coordinate of the character falls into a specific scope.

19. The mobile phone according to claim 17, wherein the first recognizer is a recognizer for judging whether or not the inputting of a character is completed according to a pause time during inputting the character.

20. The mobile phone according to claim 13, wherein said display module includes:
   a second recognizer for determining the input characters being handwriting characters or mixed characters which include handwriting characters and standard characters, and outputting a corresponding signal;
   a first display for displaying the handwriting characters in a deformative form or in a standard form; and
   a second display for displaying the handwriting characters in a standard form and outputting standard mixed characters.

* * * * *